United States Patent Office 2,859,114
Patented Nov. 4, 1958

2,859,114

DRY STEEPWATER FEED MATERIAL

Stanley A. Watson, La Grange Park, Ill., assignor to Corn Products Refining Company, New York, N. Y., a corporation of New Jersey No Drawing. Application February 21, 1957
Serial No. 641,497

2 Claims. (Cl. 99—2)

This invention relates to a feed material comprising heavy steep liquor adsorbed on certain fibrous fractions obtained in the milling of corn, e. g., spent germ flakes from corn germ.

Heavy steep liquor (containing 45 to 55 percent of water), a by-product of the wet milling industry, contains various highly nutritious materials which make it attractive as an ingredient of feed or as a feed supplement. However, its use is limited due to the high cost of shipping a material of such high water content. Removal of more than about 50 percent of the water in the steep liquor is impractical, due to evaporation costs, and certain desirable nutrients are likely to destruction by over heating. Spray dried steep liquor has the disadvantage of caking. Adsorption of steepwater on various carriers has been practised heretofore but the products obtained were subject to caking and, furthermore, there was a smaller than desired amount (under 30 percent) of steep liquor solids in the final product. In view of its excellent nutritive value, it is apparent that a dry, non-caking form of steep liquor would be desirable.

The main object of this invention is to prepare a non-caking, dry steep liquor product suitable for animal or poultry feed. Another object is to prepare such a product containing a high percentage of steepwater solids. Other objects will appear hereinafter.

I have discovered that a non-caking, easy to handle feed material containing about 60 percent of steepwater solids can be prepared by mixing, within a limited range of moisture contents, suitable combinations of certain fractions from the milling of corn and heavy steep liquor, and then drying the mixture to low moisture content. I have found that I can prepare the aforementioned product by mixing 70 to 40 percent, dry basis, of a carrier, with 30 to 60 percent of heavy steepwater containing about 45 to about 55 percent of moisture, the total moisture of the mixture being about 35 to about 42 percent and drying the mixture to a moisture content of about 4 percent at such air temperatures that the temperature of the mixture does not exceed about 250° F. The carriers may be spent corn germ flakes, such as are left after solvent extraction of corn germ or the fine fiber fraction from wet milling of corn, said fraction having a moisture content below 30 percent.

It is preferable to heat the steepwater or carrier or both prior to mixing or to heat the mixture at a temperature not exceeding about 180° F. to increase the rate at which the steepwater is adsorbed by the carrier. It is necessary to allow sufficient time in the mixing chamber to obtain complete adsorption of steepwater. Five minutes at 160 to 180° F. is usually sufficient. There is no preferred order of mixing the ingredients.

It was surprising to find that not only the total moisture content of the premix, but also the moisture contents of the individual products comprising the premix are highly critical for the practical preparation of a dry, non-caking product suitable for feed. For example, although steepwater can be evaporated to concentrations as high as 70 percent solids, when steepwater containing less than 45 percent moisture is mixed with spent germ flake or fine fiber, regardless of the moisture content of the latter, it is not absorbed into the carrier. Instead, it merely coats the outside of the particles, forming a pasty, coherent mass that cannot be mixed, conveyed or dried in commercial equipment. Large lumps which resist drying are formed when attempts are made to dry such materials in commercial dryers.

On the other hand, steepwater that contains more than 55 percent moisture, although quite readily absorbed by the carrier, yields mixtures of a very mushy or sloppy consistency. When attempts are made to dry such sloppy mixtures in commercial dryers, such as a rotary tube dryer, the walls of the dryer become plastered, and intolerable lumping occurs.

Fine fiber is normally obtained in the manufacturing process as a filter cake containing 60 to 70 percent moisture and is unsuitable for use. Fiber of such a moisture content will not form a satisfactory premix with steepwater, regardless of the water content of the latter; if highly concentrated steepwater is used, it cannot practicably be absorbed on the carrier, whereas if dilute steepwater is used sloppy mixtures are obtained which cannot be dried satisfactorily, as pointed out above.

However, if the fine fiber press cake is first disintegrated and then dried to a moisture content of not more than about 30 percent, steepwater of 45 to 55 percent moisture content is readily and completely absorbed when the two materials are mixed for about 5 minutes at up to 150° F. In the case of fine fiber, mixtures should not be heated above this temperature to avoid gelatinization of the starch contained in the fiber.

It is very important that the moisture content of the premix be within the specified range of about 35 to 42 percent to produce a satisfactory dried product in commercial drying equipment. This means that when spent germ flake or dry fine fiber (5 percent moisture) is used as a carrier, the moisture content of the steepwater must be in the range of about 49 to 55 percent. When fine fiber containing 30 percent moisture is used, the moisture content of the steepwater must be within the range of about 45 to 50 percent. As already pointed out, fine fiber containing more than about 30 percent moisture is unsuitable for use in this invention. When fiber moisture content is between 30 and 5 percent, the moisture content of the steepwater must be adjusted to a level which will give the required 35 to 42 percent moisture in the wet premix.

The following examples will further illustrate my invention. They are intended to be typical and informative and in no way limiting my invention.

Example 1

Eighty-four grams spent germ flakes (5 percent moisture) was weighed into the bowl of a double motion blender and, while mixing, 245 grams special heavy steepwater (51 percent moisture) was added. Mixing was continued with heating to 160 to 180° F. until the mix (39 percent moisture) appeared homogeneous (about 3 minutes). Heating was then discontinued but mixing was continued until absorption of steepwater appeared complete and the mix was friable (about 2 minutes, or a total of 5 minutes). The mix was transferred to the rotary dryer and dried with input air at 375 to 400° F. When exhaust air reached 250 to 255° F. (about 20 minutes), the finished product was removed from the dryer and had a moisture content of 4 percent. When stored for 72 hours at 120° F. and 6 p. s. i., the product remained free-flowing.

Example 2

Eleven gallons (113 lbs.) of heavy steepwater (28° Bé., 57.6 lbs. d. s.) and 40.4 lbs. (38.4 lbs. d. s.) spent corn germ flakes were placed in a mixer and, while the mixture was stirred, the mixer was heated so that the temperature of the mixture did not exceed 180° F. The mixture was then dried at an inlet air temperature of 320° F. to a moisture level of 4 percent. When stored for 72 hours at 120° F. and 6 p. s. i., the product showed no evidence of caking.

Example 3

One hundred and five grams of fine fiber (24 percent moisture) was mixed with 218 grams heavy steepwater (45 percent moisture) in a steam jacketed bowl of a double motion blender. The mixture was heated to not over 150° F. and mixed for about 5 minutes to obtain a homogeneous mix (37.5 percent moisture). The mixture was then dried in a rotary hot air dryer in such a manner that the temperature of the wet mixture did not exceed 160° F. As the product approached dryness, its temperature was allowed to increase toward the input temperature of 250° F. but the temperature of the product did not exceed 180° F. Drying was stopped when the product contained about 4 percent moisture. When stored for 72 hours at 120° F. and 6 p. s. i., the product remained free-flowing.

I claim:

1. A process for making a feed comprising mixing 70 to 40 percent, dry basis, of a carrier with 30 to 60 percent of heavy steepwater having a moisture content of about 45 to about 55 percent, the total moisture of the mixture being within the range of about 35 to about 42 percent, and drying the mixture, said carrier being selected from the group consisting of spent corn germ flakes and fine fiber fraction from the wet milling of corn, said fraction having a moisture content below 30 percent.

2. Process according to claim 1 wherein heating is applied during the mixing operation, the temperature of the mixture being 140 to 180° F. for the mixture containing the spent corn germ flakes and not exceeding 150° F. for the mixture containing the fine fiber.

References Cited in the file of this patent

UNITED STATES PATENTS

| | | |
|---|---|---|
| 664,262 | Gaunt | Dec. 18, 1900 |
| 920,108 | Breyer | May 4, 1909 |